United States Patent [19]

Berg

[11] 4,186,512
[45] Feb. 5, 1980

[54] ELECTRIFIED INSECT TRAP HAVING SHORT CIRCUITING MEANS

[75] Inventor: Fred W. Berg, Stamford, Conn.

[73] Assignee: Shock-M-All, Inc., Valley Stream, N.Y.

[21] Appl. No.: 837,923

[22] Filed: Sep. 29, 1977

[51] Int. Cl.² ............................................. A01M 1/22
[52] U.S. Cl. .......................................... 43/98; 43/112
[58] Field of Search ............. 43/112, 98; 339/176 MP

[56] References Cited

U.S. PATENT DOCUMENTS

| 4,074,456 | 2/1978 | Tidwell | 43/112 |
| 4,106,841 | 8/1978 | Vladic | 339/176 MP |

*Primary Examiner*—Robert C. Watson
*Attorney, Agent, or Firm*—Schwartz & Weinrieb

[57] ABSTRACT

An insect trap of the baseboard type includes a base and a detachable cover. A high-voltage electrical potential is established between first and second electrically conductive strips secured to the base, and a third electrically conductive strip is interposed between the first and second strips. A portion of the third strip is insulated from the second strip, and a fourth conductive strip is mounted upon the insulated portion of the third strip so as to be electrically connected to the second strip. The remaining portions of the third strip are engageable with and disengageable from the second strip by means of the trap cover as to alternatively short circuit, or permit the establishment of, the high-voltage electrical potential.

11 Claims, 2 Drawing Figures

ELECTRIFIED INSECT TRAP HAVING SHORT CIRCUITING MEANS

FIELD OF THE INVENTION

The present invention relates generally to insect traps, and more particularly to an electrified trap for crawling insects.

BACKGROUND OF THE INVENTION

A common problem encountered within residential and commercial establishments is the presence of crawling insects. While various measures are, of course, often implemented in order to prevent the occurrence of such a problem, insects, nevertheless, appear periodically. As is readily appreciated, such pests are unsightly, annoying, and generally undesirable.

The most common manner of dealing with the aforenoted problem involves the application of insecticidal poisons to those areas of an establishment normally inhabited by the insects, or more particularly, those areas within which the insects have been observed. This procedure must be performed periodically in order to maintain the premises substantially free of pests, however, such a procedure is necessarily quite time-consuming and expensive. In addition, the insecticidal poisons also present a certain degree of danger to humans, particularly children, and this use has therefore been restricted in restaurants, food processing establishments, institutions, nursing homes, and the like.

An alternative manner of controlling the presence of crawling pests in a given establishment involves the utilization of electrified devices or insect traps which electrocute the insects upon contact therewith. While such devices obviously rectify the time-consumption and expense disadvantages of the aforenoted insecticide application method of pest control, the devices are potentially dangerous to humans. More particularly, the electrified charges generated by the devices may not be lethal to humans, but the charges are normally sufficiently potent to seriously shock human beings. This often occurs, for example, when one of the inhabitants or proprietors of a residential or commercial establishment seeks to remove the insect carcasses from the trap.

One means which has been proposed for dealing with the foregoing problem of potential shocks to humans is to install switch mechanisms at various locations within the trap assembly or system. Such switches may obviously be utilized to disconnect the power source from the trap, or to interrupt the connections along the electrical circuitry. The provision of switch devices, however, is quite expensive, and the manual operation of the same within all areas of the trap system tends to become bothersome. A need therefore exists for a device which will automatically terminate the electrical power to the trap when, for example, it is desired to clean the same, such that the electrical shock potential is effectively nullified.

OBJECTS OF THE INVENTION

Accordingly, it is an object of the present invention to provide a new improved insect trap.

Another object of the present invention is to provide a new and improved insect trap which overcomes the various disadvantages of prior art traps and methods of achieving insect or pest control.

Still another object of the present invention is to provide a new and improved electrical insect trap.

Yet another object of the present invention is to provide a new and improved electrified insect trap which is continuously operative thereby automatically killing crawling insects.

Still yet another object of the present invention is to provide a new and improved electrified insect trap which is continuously operative yet capable of being rendered inoperative, as and when desired, in a simplified manner.

A further object of the present invention is to provide a new and improved electrified insect trap which is embodied within a baseboard structure whereby the same is completely unobtrusive.

A still further object of the present invention is to provide a new and improved electrified insect trap which is simple in structure and easy to install.

A yet further object of the present invention is to provide a new and improved electrified insect trap which is easy and safe to maintain and service.

A still yet further object of the present invention is to provide a new and improved electrified insect trap which is completely enclosed so as to house the insect carcasses and thereby preserve the appearance of the establishment room within which the trap is installed.

SUMMARY OF THE INVENTION

The foregoing and other objects are achieved in accordance with the present invention through the provision of an insect trap, of the baseboard unit type, which comprises a base and a detachable cover. A high voltage potential is established between first and second electrically conductive strips secured to the base, and a third electrically conductive strip that is interposed between the first and second strips. A portion of the third strip is insulated from the second strip, and a fourth conductive strip is mounted upon the insulated portion of the third strip so as to be electrically connected to the second strip. The remaining portions of the third strip are engageable with and disengageable from the second strip by means of the trap cover so as to alternatively short circuit, or permit the establishment of, the high-voltage electrical potential.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views, and wherein.

DETAILED DESCRIPTION OF THE PREFERRED EMBODIMENT

Figure 1:
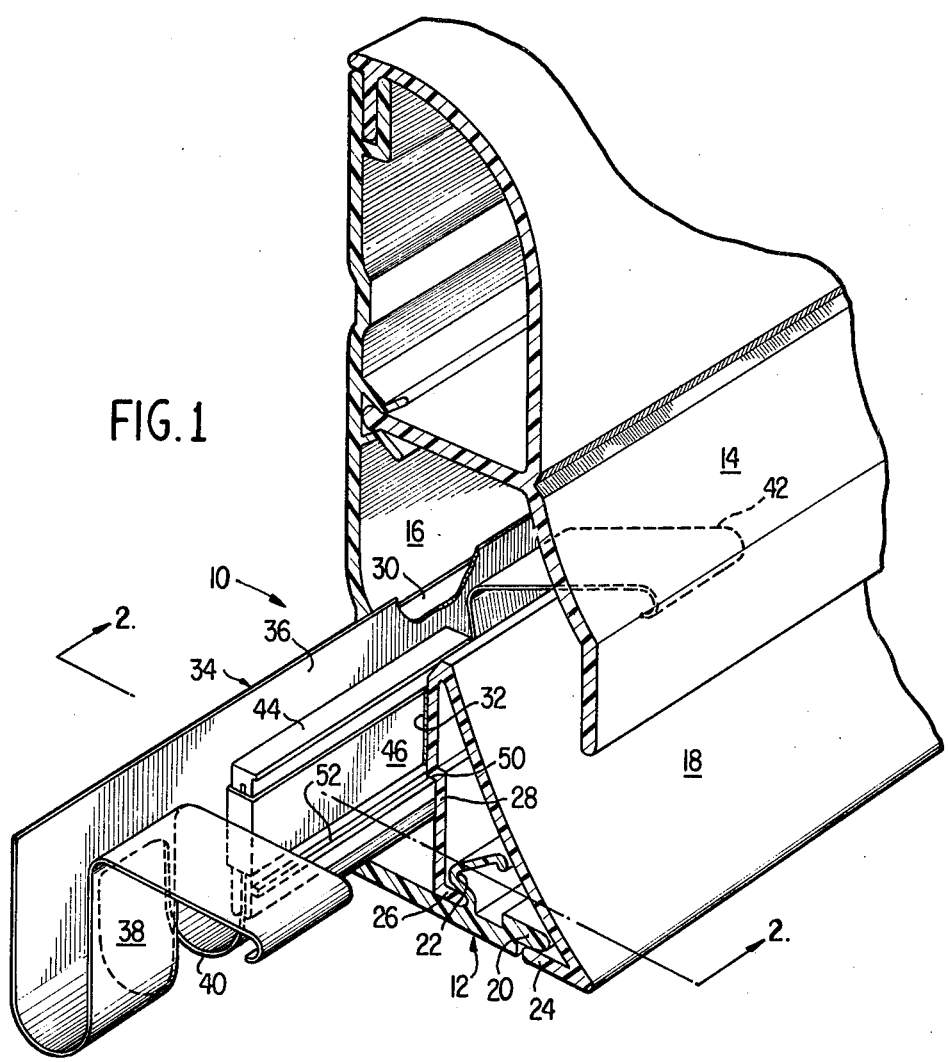
FIG. 1 is a partial perspective view of an electrified insect trap constructed in accordance with the present invention and showing its cooperative parts.

Referring now to the drawings, there is shown one section of an insect trap, generally indicated by the reference character 10, which is in the form of a baseboard unit, and it is to be understood that a multiplicity of sections may be conventionally installed within the floor region of a room, either along one or more walls thereof, or alternatively, about the entire walled periphery of the room. Each baseboard unit comprises a base assembly, generally indicated by the reference character 12, which is to be fixedly secured to the wall or floor of the room, not shown, and a cover 14 detachably mounted upon the base assembly 12.

More particularly, the base assembly 12 comprises a first longitudinally extending member 16, having a substantially L-shaped configuration in cross-section, and a second longitudinally extending member 18 having a substantially right-triangular confuguration in cross-section. The free end of the horizontally disposed leg of member 16 is provided with a longitudinally extending overhanging ledge 20, while a longitudinally extending, upstanding flanged member 22 is also provided upon the horizontally disposed leg at a position adjacent the free end thereof. The base side of triangular member 18 is open for substantially the entire side length thereof with the exception that two, oppositely disposed flanges 24 and 26 are residually defined thereon. Flanges 24 and 26 of member 18 are able to operatively engage ledge 20 and detent-type flange 22 of member 16, and in this manner, the members are capable of being snap-fitted together.

Member 16 and the vertically disposed side 28 of member 18 together define a cavity 29 which is open along the top thereof. The oppositely facing interior walls or surfaces of the vertically disposed leg of member 16 and the vertically disposed side 28 of member 18 are provided with longitudinally extending electrically conductive strips 30 and 32, respectively, which are electrically connected to the short circuit protected secondary winding of a high-voltage transformer. Through means of suitable electrical circuitry, a high voltage capacitive discharge system is defined, and consequently, a high-voltage potential is established between conductive strips 30 and 32. In this manner, when in effect, insects bridge the strips and touch both simultaneously, a lethal electrical shock is imparted to the insects.

As may be appreciated, insect carcasses normally tend to collect within cavity or chamber 29, and consequently, the latter must be periodically cleaned. In order to perform such maintenance, cover 14 is detached from base assembly 12 wherein access to cavity 29 is permitted. When cover 14 is normally in place in its attached mode with respect to base assembly 12, human beings are, of course, protected from unintentionally contacting the conductive strips 30 and 32, and consequently, there is no danger of persons receiving electrical shocks. However, when cover 14 is removed for maintenance of the trap, conductive strips are exposed, thereby presenting a dangerous condition whereby a person performing normal maintenance thereof may accidentally receive an electrical shock. Although the magnitude of the shock is sufficient to kill the insects, it is not lethal to humans, but the shock is nevertheless of such magnitude that it may seriously injure or cause discomfort to a human being. A similar device to that discussed herein, is set forth in U.S. patent application Ser. No. 745,148, filed Nov. 26, 1976. Consequently, it is desirable in accordance with this invention, to provide a system with means for nullifying the electrical circuitry when the cover 14 is removed so as to render the system safe for normal maintenance purposes.

Figure 2:
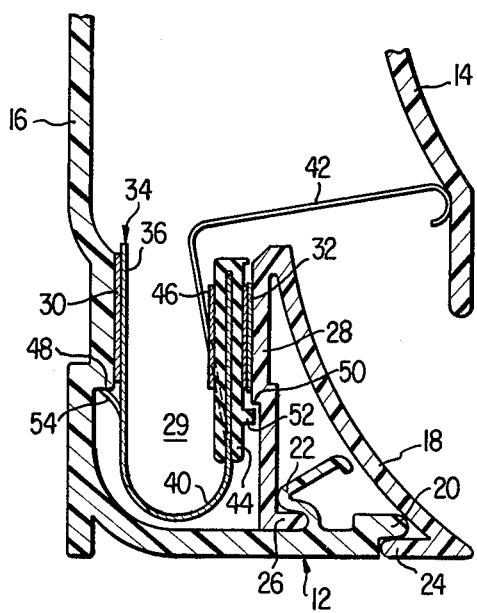
FIG. 2 is a partial, cross-sectional view of the apparatus shown in FIG. 1 taken along the line 2—2 of FIG. 1.

Accordingly, a third electrically conductive strip, generally indicated by the reference character 34, is incorporated within the system of this invention. The strip may be fabricated from resilient, spring-like material, such as, for example, beryllium copper, and is formed so as to have a substantially E-shaped configuration, as seen in a plan view. The strip therefore comprises a longitudinally extending primary body portion 36, and three, longitudinally spaced, transversely extending legs 38, 40, and 42 integral with portion 36. The strip 34 is bent so as to have a U-shaped configuration in cross section, and it is noted that the length of legs 38 and 42 is substantially greater than the length of leg 40. The extended portions of legs 38 and 42 facilitates the formation of substantially horizontally disposed sections which engage cover 14, as best seen in FIG. 2, for a purpose to be disclosed hereinafter.

The U-shaped strip 34 is adapted to be inserted within cavity 29 such that the primary body portion 36 is in electrical contact with conductive strip 30, while legs 38, 40 and 42 are normally disposed toward and tend to contact conductive strip 32 when cover 14 is detached from assembly 12. An insulating block 44 is disposed over the free end of leg 40 so as to electrically insulate both sides or surfaces of leg 40, the block being secured to leg 40 by any suitable method such as, for example, adhesive bonding, heat staking, ultrasonic welding, or the like. In addition, a fourth electrically conductive strip 46 is annularly disposed about block 44 so as to be in electrical contact with conductive strip 32.

As a result of the resiliency of conductive strip 34, the formation of the same into its U-shaped configuration, and the subsequent disposition thereof within cavity 29, causes body portion 36 and the assembly comprising leg 40, to block 44, and strip 46 to positively engage the conductive strips 30 and 32 so to provide good electrical connections therebetween. Upon installation of cover 14 upon base 12, the extended portions of legs 38 and 42 are engaged by cover 14 and are caused to be deflected away from conductive strip 32. Consequently, only the electrical contact between conductive strips 32 and 46 remains, as does the electrical contact between conductive strips 30 and 36. As described hereinabove, a high-voltage electrical potential is developed therebetween and upon an insect bridging conductive strips 36 and 46, a lethal shock is imparted thereto. Insect carcasses tend to collect within the lowermost portion of U-shaped strip 34 which defines a receptacle therefor, and the same may be periodically removed therefrom.

In order to remove the insect carcasses, cover 14 is initially detached from base 12, and as a result, the spring-biasing force of strip 34 causes the legs 38 and 42, and their extended portions, to move toward their non-deflected positions. As a result, legs 38 and 42 come into electrical contact with conductive strip 32, and in this manner, a short circuit is developed between conductive strips 30 and 32. Consequently, the trap may be serviced and cleaned without fear of accidentally touching the electrically conductive strips and receiving an electrical shock.

It will be further appreciated that, as a result of the provision of conductive strip 34, a simple means has also been provided for establishing electrical conductivity between a multiplicity of units 10 comprising the entire baseboard trap system. Thus, when the system is fabricated from a plurality of units 10 with a multiplicity of base members 12 and covers 14 arranged in a serial array, the strips 34 are disposed relative to members 12 and covers 14 so as to overlap the joints thereof defined between adjacent members are covers.

In order to fixedly retain conductive strips 34 within the trap assembly, the vertically disposed leg of member 16, as well as the vertically disposed side 28 of member 18, may be provided with oppositely disposed offset wall portions which define shoulders 48 and 50, respectively. Block 44 may be provided with oppositely disposed offset wall portions which define shoulders 48 and 50, respectively. Block 44 may be provided with a longitudinally extending rib 52 while strip 34 may be provided with integral, resilient detent-type latches 54. Upon insertion of strip 34 into cavity 29, latches 54 will be initially deflected inwardly as a result of its contact with conductive strip 30, however, upon passing beneath shoulder 48, the latches will deflect outwardly so as to engage the shoulder 48. Rib 52 also engages shoulder 50, and in this manner, the strip 34 cannot be removed from the assembly unless the latches 54 are manually deflected inwardly clear of shoulder 48.

Thus, it may be seen that the apparatus of the present invention has distinct advantages over the known prior art electrified insect traps in that the trap is provided with means which short circuits the apparatus during non-use periods whereby accidental shock or electrocution of a person is effectively prevented. The short circuiting means is automatically rendered operative when, for example, the apparatus is to be serviced, and subsequently, the short circuiting means is automatically rendered inoperative, and electrical potential insect electrification power restored, upon completion of the servicing operation and replacement of cover 14.

Obviously, many modifications and variations of the present invention are possible in light of the above teachings. It is to be understood therefore that within the scope of the appended claims, the present invention may be practiced otherwise than as described herein.

What is claimed is:

1. An electrified insect trap, comprising:
   a first member;
   a second member detachably secured to said first member;
   means mounted within said first member and engageable with said second member, for establishing an electrical potential when said second member is attached to said first member and for short circuiting said electrical potential when said second member is detached from said first member; and
   said means comprising at least two electrical conductors in a spaced apart unobstructed relationship when said second member is attached and secured to said first member thereby permitting an insect to contact both of said conductors simultaneously whereby a lethal shock is imparted to said insect.

2. An electrified insect trap as set forth in claim 1, wherein:
   said trap comprises a baseboard unit;
   said first member comprises the base of said unit; and
   said second member comprises the cover of said unit.

3. An electrified insect trap as set forth in claim 1, wherein said means comprises:
   a first electrically conductive strip;
   a second electrically conductive strip separated from said first strip for defining an electrical potential therebetween and therewith;
   a third electrically conductive strip interposed between said first and second strips;
   means insulating a first portion of said third strip from said second strip;
   a fourth electrically conductive strip mounted upon said insulating means and electrically connected to said second strip; and
   the remaining portions of said third strip being engageable with said second member and electrically disengaged from said second strip when said second member is attached to said first member, and being electrically engaged with said second strip when said second member is detached from said first member.

4. An electrified insect trap as set forth in claim 3, wherein:
   said third strip has a substantially E-shaped configuration as seen in plan view;
   said first portion of said third strip comprises the central leg of said E-shaped strip; and
   said remaining portions of said third strip comprise the remaining legs of said E-shaped strip.

5. An electrified insect trap as set forth in claim 4, wherein:
   the length of said remaining portions of said third strip is substantially greater than that of said first portion of said third strip such that said remaining portions of said third strip can operatively engage said second member when said second member is attached to said first member.

6. An electrified insect trap as set forth in claim 3, further comprising:
   receptacle means for collecting insect carcasses.

7. An electrified insect trap as set forth in claim 6, wherein:
   said third conductive strip is substantially U-shaped in cross-section,
   whereby the lowermost portion of said U-shaped strip serves as a receptacle for said carcasses.

8. An electrified insect trap as set forth in claim 4, wherein:
   said insulating means comprises a block mounted upon said central leg of said E-shaped strip; and
   said fourth strip is annularly disposed about said insulating block.

9. An electrified insect trap as set forth in claim 1, further comprising:
   latching means for fixedly securing said means within said first member.

10. An electrified insect trap as set forth in claim 1, wherein:
    said means is a spring-like material and is springingly engageable with said second member.

11. An electrified insect trap as set forth in claim 10, wherein:
    said means further defines a receptacle means for collecting insect carcasses.

* * * * *